UNITED STATES PATENT OFFICE.

WILLIAM H. WALKER, OF BOSTON, MASSACHUSETTS, ASSIGNOR TO MERRIMAC CHEMICAL COMPANY, OF BOSTON, MASSACHUSETTS, A CORPORATION OF MASSACHUSETTS.

METHOD OF MAKING FORMIC ACID.

1,048,609.      Specification of Letters Patent.      Patented Dec. 31, 1912.

No Drawing.      Application filed April 11, 1908. Serial No. 426,605.

*To all whom it may concern:*

Be it known that I, WILLIAM H. WALKER, a citizen of the United States, residing at Boston, in the county of Suffolk and State of Massachusetts, have invented certain new and useful Improvements in Methods of Making Formic Acid, of which the following is a specification.

The object of this invention is to provide an efficient and economical method of producing formic acid from formates.

In U. S. Letters Patent, No. 806,660, granted December 5, 1905, to Max Hamel for a process of making concentrated formic acid it is stated:—" On account of the ease with which formic acid decomposes in the presence of concentrated sulfuric acid the transformation of the dry formates could only be effected with sulfuric acid having a strength of at most 60° Baumé." It is further stated therein:—" The mixing of the dry formate with the sulfuric acid cannot for various reasons be effected so exactly as to obtain a good yield. Thus if high-concentrated sulfuric acid is allowed to drop on formate a very considerable rise of temperature locally occurs which cannot be removed by cooling, as in the mass lumps or the like are formed, so that the mass becomes thick and cannot be stirred, and the sulfuric acid being not rapidly combined comes in contact with the formic acid set free and decomposes the same."

I have discovered that although these statements are correct as applied to sodium formate in its commercial form which while apparently dry contains a considerable proportion of moisture, probably largely combined therewith as a water of crystallization, they are not correct as applied to the salt from which substantially all of the water including the water of crystallization has been removed by appropriate dehydrating methods. Sodium formate is quite deliquescent, and the salt which has been exposed to moist air or which has not been carefully dried and thereafter shielded from moisture contains a considerable proportion of water, usually from two to three per cent., from which it parts with difficulty. If sodium formate be dried at temperatures above 100° C., for a sufficient time, for instance at about 130° C., for four or five hours, or at a lower temperature under reduced pressure or *in vacuo*, it will contain not more than 0.4 per cent. of moisture. I have found that this dried or substantially water free salt may be employed for the production of formic acid with a high degree of efficiency under conditions which are quite inapplicable to ordinary sodium formate. For example, if sulfuric acid containing about 88 per cent. of $H_2SO_4$ be added to sodium formate substantially free from water, under conditions permitting good mixing and with reasonable cooling of the reacting mass, there is practically no decomposition of the formic acid by the sulfuric acid. Under these conditions the formic acid produced is found to be formed in substantially the theoretical proportion and to possess substantially the theoretical concentration, showing that practically no decomposition has occurred; for since one of the products of decomposition is water any substantial loss of acid would result in a diluted product. The drying of the salt is also advantageous as a preliminary to its reaction with sulfuric acid of even much higher concentration. By proceeding as above described the necessity for providing an additional anhydrous solvent for the salt may be avoided and the expense of producing formic acid of any desired concentration up to the so-called anhydrous state, may be materially lessened.

While I have described specifically the decomposition of sodium formate, it will be understood that the invention is applicable to the preparation of formic acid from other formates. The formic acid produced as above described may be recovered by distillation or in any desired or usual manner.

I claim:—

The process of making formic acid which consists in reacting with strong sulfuric acid upon a formate substantially free from water, whereby the reaction proceeds without injurious rise of temperature or substantial loss of formic acid.

In testimony whereof, I affix my signature in presence of two witnesses.

WILLIAM H. WALKER.

Witnesses:
    WALTER HUMPHREYS,
    J. M. COMSTOCK.